Feb. 5, 1957
H. J. FLAIR
2,780,006
FLEXIBLE MECHANICAL RECORDER
Filed Feb. 23, 1954
2 Sheets-Sheet 1
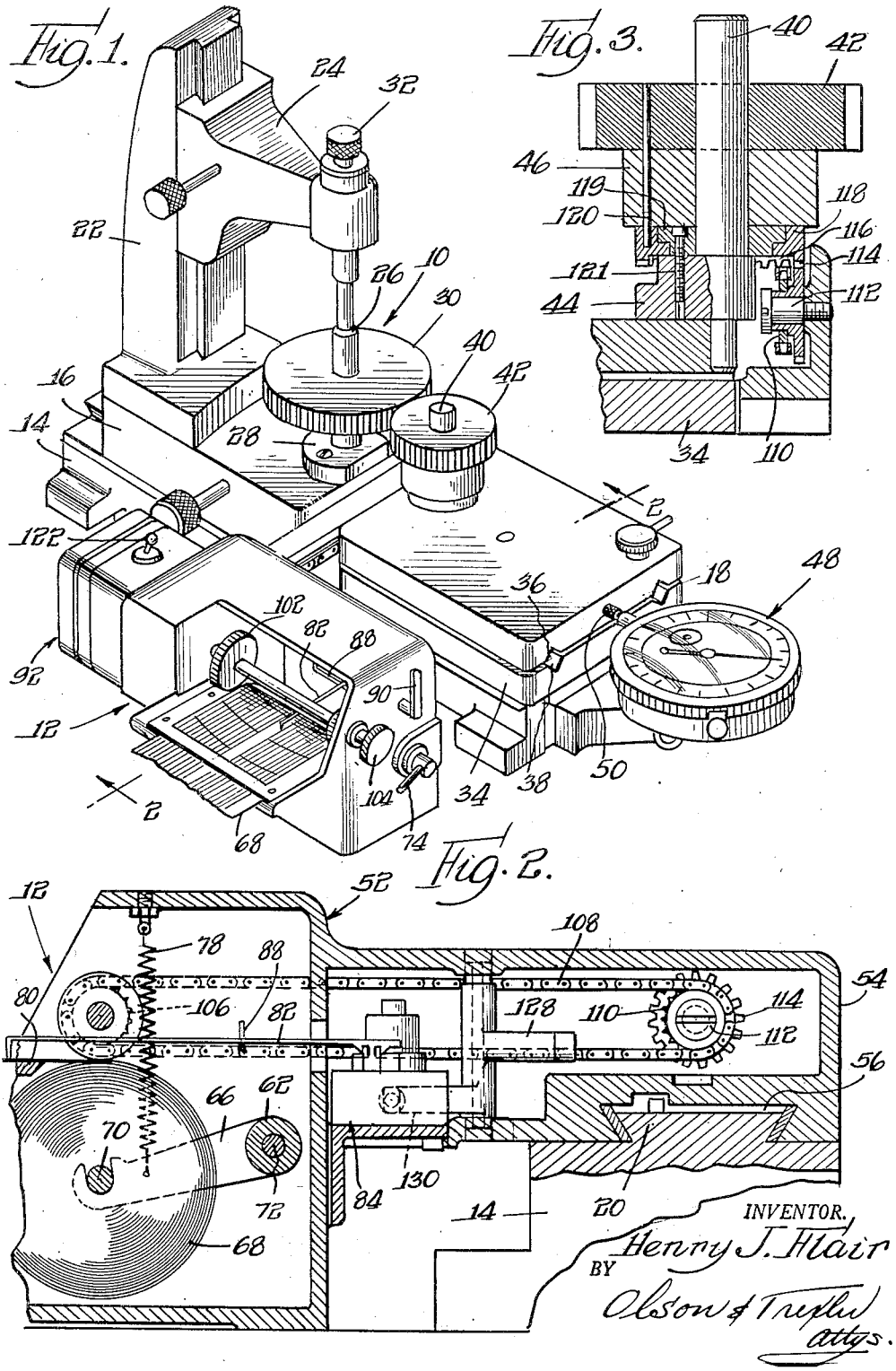
INVENTOR.
Henry J. Flair
BY
Olson & Trexler
attys.

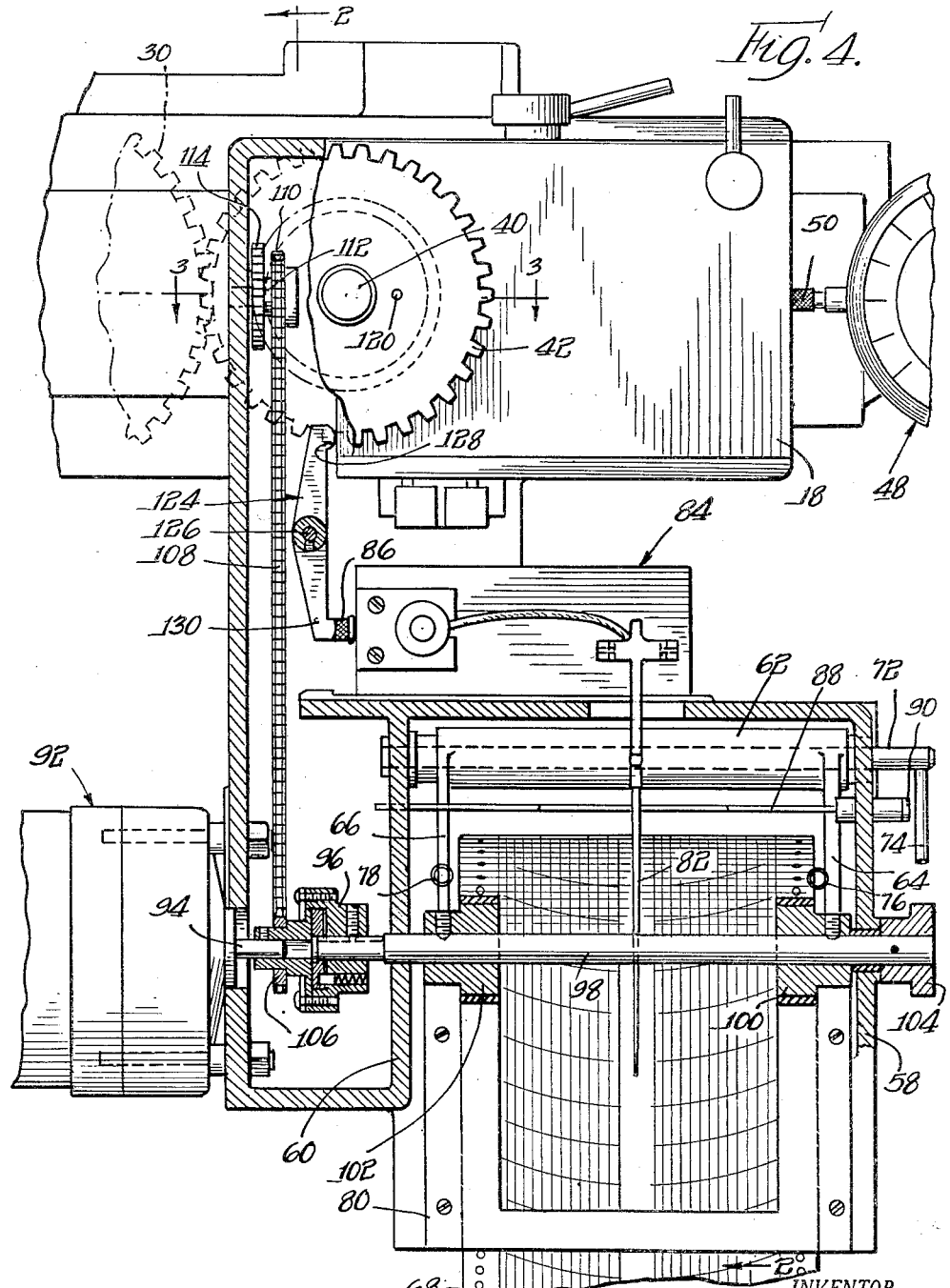

United States Patent Office 2,780,006
Patented Feb. 5, 1957

2,780,006

FLEXIBLE MECHANICAL RECORDER

Henry J. Flair, Chicago, Ill., assignor to Illinois Tool Works, Chicago, Ill., a corporation of Illinois Application February 23, 1954, Serial No. 411,743

3 Claims. (Cl. 33—179.5)

The present invention relates to a novel recording apparatus for gear checking machines and, more particularly, to a novel recording apparatus for handrolling gear checking or measuring machines.

There are at present a considerable number of handrolling gear measuring or checking machines in use. Various forms of these machines are well known and usually include a base, a mandrel for supporting a master gear, means for supporting a work piece for meshing engagement with the master gear, and hand operated means for rolling the gears together. In addition, the master gear is usually mounted on a spring biased slide so that any irregularities in the work piece cause the master gear and its slide to move and this movement is indicated by a dial of well known construction. In general, these handrolling measuring machines are valuable for many checking operations. However, there are many other operations that require a permanent record of the results. Furthermore, the handrolling operation is often relatively slow and, therefore uneconomical. For these and other reasons, the handrolling gear measuring machines now in use are not always satisfactory for a particular job and it is an object of the present invention to increase the usefulness of such measuring machines now in use by providing a novel attachment whereby the handrolling machines may be converted into automatic machines capable of recording the results of the measuring or testing operation.

Another object of the present invention is to provide a novel attachment of the type described above which is of relatively simple and economical construction and which may be readily applied to or removed from handrolling gear checking machines presently in use.

Still another object of the present invention is to provide a novel attachment of the type described above which is compact and rugged and which is capable of accurately recording results of a testing operation.

Other objects and advantages of the present invention will become apparent from the following description and accompanying drawings wherein:

Fig. 1 is a perspective view of an attachment embodying the principles of this invention applied to a handrolling gear measuring machine;

Fig. 2 is a fragmentary cross-sectional view of the mechanical recorder device shown in Fig. 4;

Fig. 3 is a fragmentary cross-sectional view taken along line 3—3 in Fig. 4; and Fig. 4 is an enlarged fragmentary plan view partially broken away to illustrate certain details of the attachment more clearly.

Referring now more specifically to the drawings wherein like parts are designated by the same numerals throughout the various figures, a handrolling gear measuring machine 10 to which an attachment 12 embodying the principles of this invention may be applied is shown best in Fig. 1. The machine 10 includes a base 14 on which is mounted a work piece supporting carriage or slide 16 and a gear supporting slide 18. The carriage 16 is adapted to be moved along a dovetail guide 20 and locked in any desired adjusted position by conventional means, not shown. A standard 22 is mounted on the carriage 16 and an arm 24 is vertically adjustably supported by the standard. Any suitable means, such as a mandrel 26, may be provided between the adjustable arm 24 and a block 28 on a slide 16 for rotatably supporting a work piece gear 30. Preferably, the gear is fixed to the mandrel and the mandrel is connected to a knob 32 so that the gear may be manually rolled or rotated by the turning knob. The slide member 18 is mounted upon a block 34 by means of ball bearings, not shown, disposed within cooperating V grooves 36 and 38. The block 34 may be adjustably mounted on the base, if desired. A mandrel 40 is carried by the slide 18 and, in turn, rotatably supports a master gear 42. The master gear is spaced above the slide 18 by means of a bearing block 44 and, if necessary, by a spacer 46.

A dial mechanism 48 is mounted to the end of the base 14 for indicating any movement of the slide 18 toward or away from the work piece gear. The dial mechanism includes a spring biased plunger 50 operatively engageable with the slide 18. It is understood that as the work piece and master gears are rolled together, any inaccuracies in the work piece gear will cause movement of the master gear and the slide 18 toward or away from the work piece gear, which movement is indicated by the dial mechanism 48. While the structure and operation of the handrolling gear measuring machine 10 have been somewhat briefly set forth herein, this structure and operation is well known and need not be further described.

In accordance with the present invention, the handrolling gear measuring machine 10 may be converted into an automatic machine for permanently recording the results of a gear measuring operation by applying the attachment 12 to the measuring machine. The attachment 12 includes a housing 52 which is adapted to be connected to the machine 10. As shown best in Fig. 2, the housing 52 is provided with an elongated hollow arm portion 54 having a groove 56 suitably formed to receive the dovetail guide 20. With this structure, the attachment may be easily applied to the machine 10 simply by removing the slide member or carriage 16 and sliding the attachment housing portion 54 over the end of the dovetail guide 20. The carriage 16 is, of course, replaced and the housing portion 54 is held in place between the carriage 16 and the block 34.

The outer portion of the housing 52 includes a pair of spaced walls 58 and 60 between which is disposed a bracket member 62 having arms 64 and 66 adapted to support a roll of paper 68. The roll of paper may be mounted on a suitable shaft 70 which is adapted to fit within slots in the ends of the arms 64 and 66. The bracket 62 is fixed on a shaft 72 journaled in the walls 58 and 60 and a handle 74 is fixed to the outer end of the shaft 72 for pivoting the bracket to lower the paper roll for reloading. The bracket is normally resiliently biased upwardly by a pair of springs 76 and 78 respectively connected between the arms 64 and 66 and the housing. A table 80 is horizontally disposed between the housing walls 58 and 60 and the paper is passed over the table. An inking pen 82 is disposed above the table for recording the results of a testing or measuring operation on the paper. This inking pen may be of any well known construction and is actuated by means indicated generally by the numeral 84. The actuating means includes a resiliently biased plunger 86 which is operated in a manner more fully described hereinbelow, and otherwise may be of any well known construction and, therefore, need not be described in detail. A pen lifting bar 88 is journaled between the walls 58 and 60 and may be operated by a handle 90 for lifting the pen when the the attachment is not in use or for any other desired purpose.

In order to rotate the master and work piece gears and to feed the recording paper 68 automatically in timed relationship, motor means 92 is secured to one side of the attachment housing. This motor means may include any conventional electric motor and speed reducing gearing so that the output shaft 94 is continuously driven at a relatively low speed. The output shaft 94 is connected through a slip clutch 96 to a rotatably mounted shaft 98 having paper driving rollers 100 and 102 fixed thereon. A hand knob 104 is secured to the shaft 98 so that the paper may be advanced or retracted by hand before starting a measuring operation. The master gear is also driven from the shaft 94 and this is accomplished by operatively fixing a fine pitch sprocket 106 to the drive shaft 94 and wrapping a chain 108 around the sprocket 106 and a second sprocket 110 rotatably mounted on a stub shaft 112. As shown best in Fig. 4, the stub shaft 112 is positioned on the housing attachment portion 54 so that the sprocket 110 is located beneath the master gear. As shown best in Fig. 3, the sprocket 110 is rotatably mounted on the stub shaft 112 by means of a hub of a gear 114. Suitable means such as a key, not shown, may be provided for preventing relative rotation between the gear 114 and the sprocket 110. The gear 114 meshes with the axially projecting teeth 116 of a gear or crown rack 118 rotatably mounted on the mandrel 40 between the bearing block 44 and the spacer 46. A flanged bearing member 119 secured to the bearing block 44 by screws 121 is provided for restraining the gear 118 against axial movement. The gear 118 is fixed to the master gear 42 by any suitable means such as pins 120. With this structure, it is seen that upon operation of the motor means 92, the master gear will be rotated in predetermined timed relationship with respect to the rate of feeding movement of the paper. The motor means may be controlled by any suitable means such as a toggle switch 122.

In order to operate the pen actuating means, a lever 124 is pivotally mounted within the attachment portion 54 of the housing by means of a shaft 126. As shown best in Figs. 2 and 4, the lever has an arm portion 128 disposed to engage an end of the slide 18 and a second arm portion 130 disposed to engage the spring biased plunger 86. Thus, any movement of the slide 18 will be transferred to the plunger 86 through the lever. Preferably, the pen actuating mechanism 84 is such that any movement of the slide will be greatly magnified and then imparted to the pen.

A brief resumé of the operation of the above described apparatus is as follows. The attachment is, of course, first mounted on the handrolling machine by sliding the dovetail guide into the groove 56 in the attachment housing or support means. The carriage 16 is then reassembled with the remainder of the apparatus and the master and work piece gears are properly mounted in meshing relationship. A supply of paper must, of course, be provided and, as mentioned, the paper roll may be mounted by swinging the arms of the paper supporting bracket downwardly and then inserting the shaft 70 into the notches provided in the ends of the arms. The springs then pull the paper roll upwardly and into engagement with the friction feed rollers 100 and 102. If desired, the paper may be swung downwardly from the feed rollers in order to permit the paper to be adjusted over the table 80 without interference from the feed rollers. After the apparatus has been set up in the manner just described, the operator need only to actuate the toggle switch 122 to energize the motor means 92 whereupon the master and work piece gears are rotated in timed relationship with the feeding movement of the paper. As will be understood, any inaccuracies in the work piece gear causes the slide 18 to move back and forth and this movement is magnified by the pen actuating means 84 and traced by the pen upon the paper.

From the above description, it is seen that the present invention has provided a novel attachment for recording the results of a gear testing operation, which attachment may be readily applied to handrolling gear measuring machines now in use. In addition, it is seen that the novel attachment of this invention is of relatively simple and compact construction for economical production and maintenance while at the same time the attachment is capable of recording the results of a testing operation accurately.

While the preferred embodiment of the present invention has been shown and described, it is obvious that many structural details may be changed without departing from the spirit and scope of the appended claims.

The invention is claimed as follows:

1. A detachable recording attachment for a handrolling gear testing machine having a base, slide member operatively supported on said base, a second member supported on said base, and means on said members for rotatably supporting a master gear and a work piece gear for meshing engagement, said slide member and the gear thereon being movable relative to the other gear in accordance with any inaccuracies in the workpiece gear, said recording attachment comprising support means, said support means including a portion adapted to be positioned between said members of a handrolling gear testing machine, said support means portion having means for removable attachment to the base of a handrolling gear testing machine, means for mounting a supply of paper on said support means, a marking instrument carried by said support means, means carried by said support means for engaging said slide member and for actuating said marking instrument to record results of a gear testing operation on said paper, a drive gear carried by said slide member and rigidly connected with said gear rotatably carried by said slide member, and means mounted on said support means for driving said master and work piece gears and for feeding said paper in timed relationship, said last named means including a gear meshing with said drive gear in all positions of the slide member while a work piece is being checked.

2. A detachable recording attachment for a handrolling gear testing machine having a base, a slide member supported on said base, a second member supported on said base, and means on said members for rotatably supporting a master gear and a work piece gear for meshing engagement so that said slide member and the gears thereon shift relative to the other gear in accordance with any inaccuracies in the work piece gear, said recording attachment comprising support means, said support means having a first portion adapted to be located laterally of the base of a handrolling gear testing machine and a second portion adapted to be positioned between said members of a handrolling gear testing machine, means for releasably attaching said support means to the base of a handrolling gear testing machine, means for mounting a supply of paper on said first support means portion, a marking instrument carried by said first support means portion, means for actuating said marking instrument to record results of a gear testing operation on said paper, motor means mounted on said first support means portion, roller means for feeding the paper, a drive gear adapted to be rotatably mounted on said gear supporting means on said slide member and interconnected with said first mentioned gear on said slide member, gear means mounted on said second support means portion for rotating said drive gear and thereby rotating said master and work piece gears, endless chain means operatively interconnecting said motor means and said gear means, and means interconnecting said motor means and said roller means, whereby said gear means and said roller means are driven in timed relationship.

3. A combination as defined in claim 1, wherein said drive gear is a crown rack and is rigidly interconnected with said master gear, and wherein said last named driving means includes an endless chain extending between said last named gear which meshes with the crown rack and a driving member.

References Cited in the file of this patent

UNITED STATES PATENTS

| Re. 22,110 | Poupitch | June 9, 1942 |
| 2,514,716 | Muller | July 11, 1950 |